United States Patent
Smith et al.

(10) Patent No.: US 11,206,753 B2
(45) Date of Patent: Dec. 28, 2021

(54) SYSTEM AND METHOD FOR CONTROLLING AN AGRICULTURAL IMPLEMENT DURING THE PERFORMANCE OF A TILLAGE OPERATION

(71) Applicant: CNH Industrial America LLC, New Holland, PA (US)

(72) Inventors: Kevin M. Smith, Narvon, PA (US); John H. Posselius, Ephrata, PA (US); Christopher A. Foster, Mohnton, PA (US); Joshua David Harmon, Lititz, PA (US); Bruce Anderson, Lancaster, PA (US)

(73) Assignee: CNH Industrial America LLC, New Holland, PA (US)

( * ) Notice: Subject to any disclaimer, the term of this patent is extended or adjusted under 35 U.S.C. 154(b) by 256 days.

(21) Appl. No.: 16/442,026

(22) Filed: Jun. 14, 2019

(65) Prior Publication Data
US 2020/0390018 A1 Dec. 17, 2020

(51) Int. Cl.
*A01B 35/08* (2006.01)
*A01B 39/22* (2006.01)
*A01B 63/10* (2006.01)
*A01B 79/00* (2006.01)

(52) U.S. Cl.
CPC .............. *A01B 35/08* (2013.01); *A01B 39/22* (2013.01); *A01B 63/10* (2013.01); *A01B 79/005* (2013.01)

(58) Field of Classification Search
CPC ......... A01B 35/08; A01B 35/22; A01B 39/22; A01B 79/005; A01B 63/10
See application file for complete search history.

(56) References Cited

U.S. PATENT DOCUMENTS

| 4,316,508 | A | 2/1982 | Whitfield |
| 4,834,461 | A | 5/1989 | Fidler et al. |
| 5,954,139 | A | 9/1999 | Forsyth |
| 6,041,582 | A | 3/2000 | Tiede et al. |
| 7,658,234 | B2 | 2/2010 | Brandt et al. |

(Continued)

OTHER PUBLICATIONS

PCT International Search Report and Written Opinion issued in corresponding Application PCT/US2020/036984 dated Sep. 29, 2020 (12 pages).

(Continued)

*Primary Examiner* — Tara Mayo-Pinnock
(74) *Attorney, Agent, or Firm* — Rebecca L. Henkel; Rickard K. DeMille

(57) ABSTRACT

A system for controlling an implement during a tillage operation may include a frame and a ground-engaging tool pivotally coupled to the frame and movable relative to the frame between a retracted position and an extended position. An actuator may be configured to bias the ground-engaging tool towards the extended position during the tillage operation. An adjustable valve may be configured to permit flow out of the actuator when a fluid pressure of the actuator exceeds a reset pressure such that the actuator allows the ground-engaging tool to pivot towards the retracted position. A controller may be configured to determine at least one of an actuator position or a load value indicative of a force applied by the ground-engaging tool against the soil during the tillage operation and adjust the reset pressure based on the at least one of the actuator position or the load value.

21 Claims, 5 Drawing Sheets

(56) References Cited

U.S. PATENT DOCUMENTS

| | | |
|---|---|---|
| 8,083,004 B2 | 12/2011 | Knight, Jr. |
| 8,720,595 B2 | 5/2014 | Sulzer |
| 8,827,001 B2 | 9/2014 | Wendtte et al. |
| 8,838,346 B1 | 9/2014 | Griffin |
| 8,857,530 B2 | 10/2014 | Henry |
| 9,062,437 B2 | 6/2015 | Hall |
| 9,113,589 B2 | 8/2015 | Bassett |
| 9,213,905 B2 | 12/2015 | Lange et al. |
| 2016/0183446 A1* | 6/2016 | Achten et al. ......... A01B 49/02 172/2 |
| 2018/0160613 A1 | 6/2018 | Kovach et al. |
| 2018/0310465 A1 | 11/2018 | Peterson et al. |
| 2018/0310466 A1* | 11/2018 | Kovach et al. ........ A01B 19/02 |

OTHER PUBLICATIONS

Dan Bloomer, Getting Ahead of the Curve, AgriHQ, dated Sep. 9, 2014, (4 pages) https://agrihq.co.nz/#.

* cited by examiner

SYSTEM AND METHOD FOR CONTROLLING AN AGRICULTURAL IMPLEMENT DURING THE PERFORMANCE OF A TILLAGE OPERATION

FIELD

The present disclosure generally relates to agricultural implements and, more particularly, to systems and methods for controlling an agricultural implement during the performance of a tillage operation.

BACKGROUND OF THE INVENTION

It is well known that, to attain the best agricultural performance from a field, a fanner must cultivate the soil, typically through a tillage operation. Modern farmers perform tillage operations by pulling a tillage implement behind an agricultural work vehicle, such as a tractor. Tillage implements typically include a plurality of ground-engaging tools configured to till the soil over which the implement travels. For example, the implement may include certain ground-engaging tools, such as shanks, configured to penetrate the soil to a particular depth. In this respect, the ground-engaging tools may be pivotally coupled to a frame of the implement. Tillage implements may also include additional ground-engaging tools, such as harrows configured to level or otherwise flatten any windrows or ridges in the soil and/or baskets configured to reduce the number of clods in the soil and/or firm the soil over which the implement travels.

Such ground-engaging tools may be biased towards a ground-engaging position by an actuator. The actuator may be connected with a relief valve to allow the actuator to compress such that the ground-engaging tool can pivot away from the ground-engaging position when the ground-engaging tool impacts an impediment, such as a rock. However, resistance caused by the soil may vary such that a single relief valve pressure may not be appropriate in all circumstances.

Accordingly, a method and related system for automatically controlling an agricultural implement during the performance of a tillage operation would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for controlling an implement during the performance of a tillage operation with respect to soil in a field. The system may include a frame and a ground-engaging tool pivotally coupled to the frame such that the ground-engaging tool is movable relative to the frame between a retracted position and an extended position. The system may include an actuator coupled to the frame and configured to bias the ground-engaging tool towards the extended position during the tillage operation. The system may include an adjustable valve configured to permit flow out of the actuator when a fluid pressure of the actuator exceeds a reset pressure such that the actuator allows the ground-engaging tool to pivot towards the retracted position. The system may include a controller communicatively coupled with the adjustable valve. The controller may be configured to determine at least one of an actuator position of the actuator or a load value indicative of a force applied by the ground-engaging tool against the soil during the tillage operation. The controller may be configured to adjust the reset pressure based on the at least one of the actuator position or the load value.

In another aspect, the present subject matter is directed to a method for controlling a tillage operation with respect to soil in a field being performed with an implement. The implement may include a frame and a ground-engaging tool pivotally coupled to the frame such that the ground-engaging tool is movable between a retracted position and an extended position relative to the frame. The method may include determining, by one or more computing devices, at least one of an actuator position of an actuator coupled to the frame and configured to bias the ground-engaging tool towards the extended position during the tillage operation or a load value indicative of a force applied by the ground-engaging tool against the soil during the tillage operation. The method may include adjusting, by the one or more computing devices, a reset pressure associated with an adjustable valve based on the at least one of the actuator position or the load value, the adjustable valve being configured to permit flow out of the actuator when a fluid pressure of the actuator exceeds the reset pressure such that the actuator permits the ground-engaging tool to pivot towards the retracted position.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
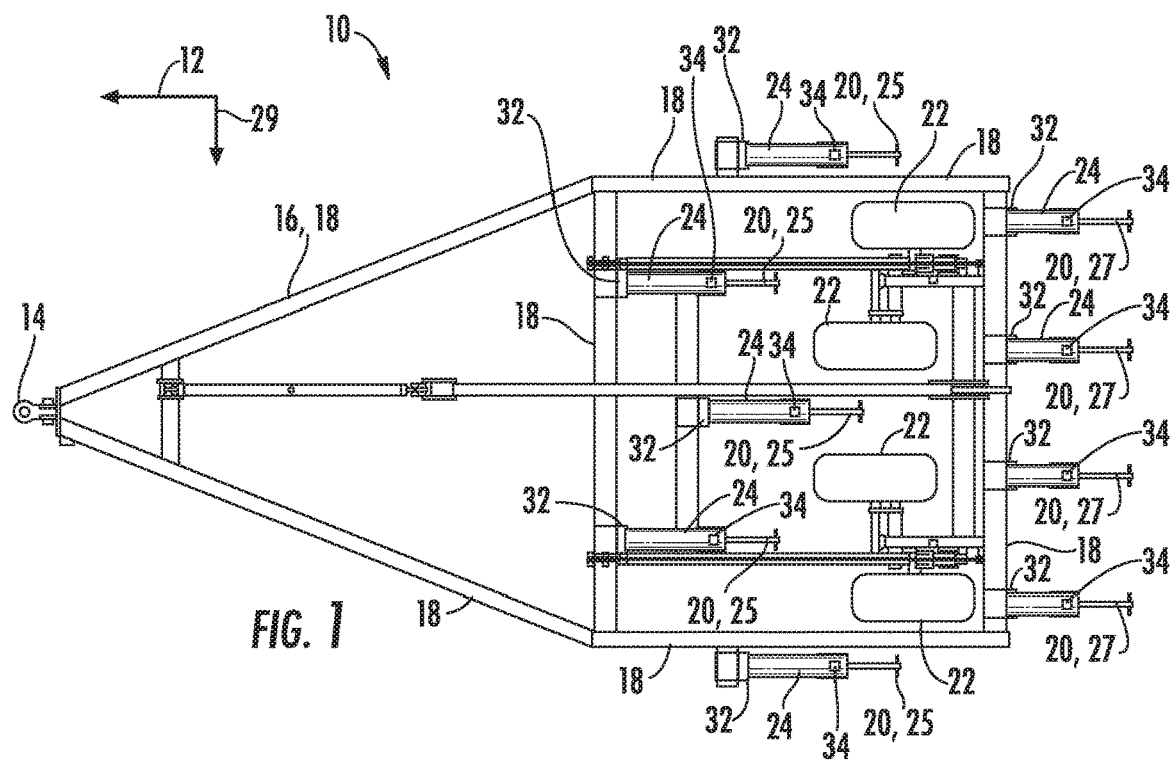
FIG. 1 illustrates a top down view of one embodiment of an agricultural implement accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

A tillage implement, or other agricultural implement, may be moved across a field to perform an agricultural operation, such as a tilling operation. A control system associated with the implement may control the positions of various ground-engaging tools supported on the implement with respect to a ground surface over which the implement is moved. Actuators may be associated with the ground-engaging tools and configured to permit the ground-engaging tools to pivot towards a retracted position, for example when impacting an underground object. One or more adjustable valves may be configured to permit retraction of the actuators by allowing hydraulic fluid to flow out of the actuators when respective fluid pressures within the actuators exceed the reset pressures of the associated adjustable valve. An operator may set a desired operating reset pressure associated with the adjustable valves.

The system may include a controller configured to adjust the reset pressures of the adjustable valves as the implement is moved through the field. For example, the amount of pressure required to properly bias the actuators but still allow the ground-engaging tools to pivot when impacting an underground object may change as the implement is moved across the field. As another example, the operator may set the pressure too high or low for the soil characteristics and/or implement speed.

The controller may be configured to detect the position of the actuators and/or a load value indicative of a force applied by the ground-engaging tool against the soil during the tillage operation. The controller may adjust the reset pressure(s) based on the detected position and/or load value. For example, the controller may increase the reset pressure when a low pressure pattern associated with the position of one of more of the actuators is detected. As another example, the controller may be configured to reduce the reset pressure when an object collision pattern (e.g., a rapid spike) associated with the load value is detected. Such a reduction may allow the ground-engaging tool to more easily pivot towards the retracted position such that the ground-engaging tool can pass over the underground obstacle without damaging the ground-engaging tool or implement.

Referring now to the drawings, FIG. 1 illustrates a top down view of one embodiment of an agricultural tillage implement 10 in accordance with aspects of the present subject matter. More specifically, the tillage implement 10 may be a ripper, which may configured to break up compacted or dense soil, for example, during an initial pass through the field. Although described with reference to a ripper tillage implement 10, it should be understood that the implement may be any suitable type of tillage implement or any other suitable type of agricultural implement.

In general, the tillage implement 10 may be configured to be towed across a field along a direction of travel 12 by the work vehicle. The work vehicle may be an agricultural tractor or any other suitable agricultural vehicle for use in traversing the field. The implement 10 may be coupled to the work vehicle via a hitch assembly 14 or using any other suitable attachment means.

The tillage implement 10 may include an implement frame 16. The frame 16 may include a plurality of structural frame members 18, such as beams, bars, and/or the like, configured to support or couple to a plurality of ground-engaging tools 20. Additionally, a plurality of wheels 22 may be coupled to the frame 16 to facilitate towing the implement 10 in the direction of travel 12.

In some embodiments, the ground-engaging tools 20 may be or include shanks, such as ripper shanks. However, the ground-engaging tools 20 may be or include any type of ground-engaging tool suitable for a tillage operation, such as tillage discs.

The actuators 24 and/or ground-engaging tools 20 may be arranged in rows. For example, the actuators 24 may be arranged in a front row 25 and a rear row 27 with respect to the direction of travel 12. The actuators 24 in each row 25, 27 may be spaced apart in a lateral direction 29 that is perpendicular to the direction of travel 12. In some embodiments, the implement 10 may include additional rows of actuators and/or ground-engaging tools between the front row 25 and rear row 27.

Figure 2:
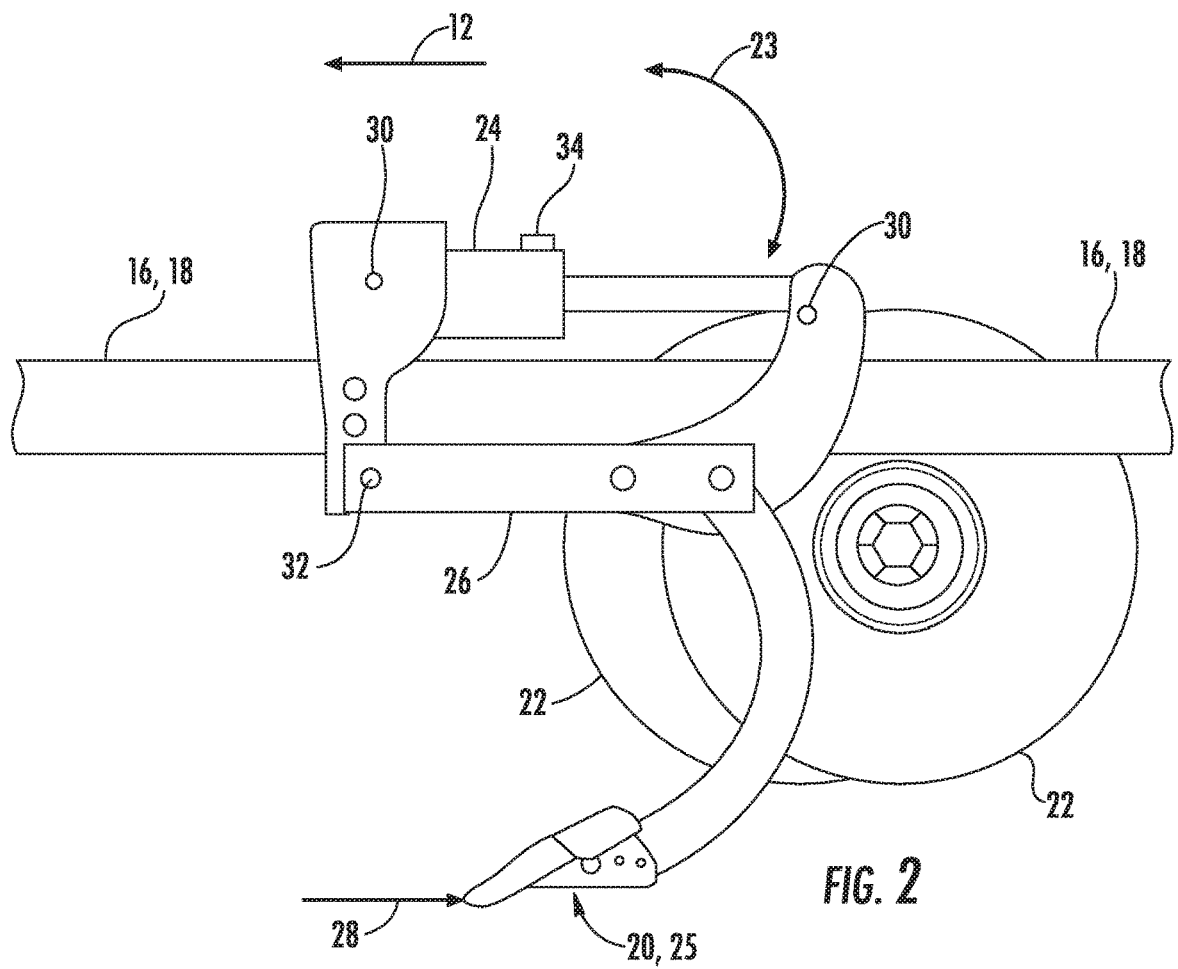
FIG. 2 is a simplified side view of a portion of FIG. 1 and illustrates a single ground engaging tool coupled to a frame of the agricultural implement of FIG. 1 in accordance with aspects of the present subject matter.

FIG. 2 is a simplified side view of a portion of FIG. 1 and illustrates a single ground engaging tool 20. The ground engaging tool may be pivotally mounted to the frame 16 to allow the ground-engaging tools 20 to pivot out of the way of rocks or other impediments in the soil. The ground-engaging tool 20 may be pivotally coupled to the frame 16 such that the ground-engaging tool 20 is movable relative to the frame 16 between a retracted position and an extended position (illustrated by arrow 23 in FIG. 2). The respective actuator 24 associated with the around-engaging tool 20 may be coupled to the frame 16 and configured to bias the ground-engaging tool 20 towards the extended position during the tillage operation. Some or all of the ground-engaging tools 20 may be mounted to the frame 16 in the manner described with reference to FIG. 2.

In some embodiments, an arm 26 may be pivotally coupled with the frame 16 and the ground-engaging tool 20. The actuator 24 may be coupled with each of the frame 16 and the arm 26 such that the actuator 24 can bias the ground engaging tool 20 towards the extended position. When the ground-engaging tool 20 impact an obstacle, such as a rock, the force against the ground-engaging tool 20 may cause the ground-engaging tool 20 to pivot towards the retracted position (illustrated by arrow 23 in FIG. 2). The actuator 24 may be compressed towards a retracted position.

In some embodiments, one or more adjustable valves may be configured to permit such retraction of the actuators 24. A hydraulic source, such as a pump, may provide a flow of hydraulic fluid through the adjustable valve(s) to the actuator(s) 24. The adjustable valve(s) may be configured as adjustable pressure reducing/relief valve(s). The adjustable valve(s) may have associated reset pressures. When fluid pressures within the respective actuator(s) 24 exceeds the reset pressure of the associated adjustable valve, the adjustable valve may permit a flow of hydraulic fluid out of the respective actuator 24 such that the respective actuator 24 may be compressed to allow the respective ground-engaging tool 20 to pivot towards the retracted position. Thus, the adjustable valve may facilitate pivoting of the ground-engaging tool 20 towards the retracted position when a large force is applied to ground-engaging tool, for example from an impact with an underground obstacle.

When fluid pressure within the actuator 24 is reduced (e.g., after the impact), the adjustable valve may provide the reset pressure or another predetermined pressure to the actuator 24. For example, the adjustable valve may provide a predetermined return pressure that is greater than the reset pressure. This may extend the actuator 24 to pivot the ground-engaging tool 20 towards the extended position.

The adjustable valve(s) and actuators 24 may be connected in various configurations. For example, each actuator 24 may be fluidly connected with a respective relief valve. In other embodiments, multiple actuators 24 may be fluidly connected with a single relief valve. For example, adjustable valve(s) may be fluidly connected with all of the actuators 24 that are configured to permit the ground-engaging tools 20 to pivot towards the retracted position.

The implement 10 may include one or more sensors configured to measure a force that is indicative of a force 28 applied between the ground-engaging tool 20 and the soil (illustrated by arrows 28 in FIG. 2). For example, one or more load sensors 30 (e.g., load pins, axial load sensors, etc.) may be coupled between the actuator 20 and the frame 16 and configured to measure an axial load of the actuator 20. In some embodiments, an arm load sensor 32 (e.g., load pins, axial load sensors, etc.) may be coupled between at least one arm 26 and the frame 16 and configured to measure an arm force between the frame 16 and the arm 26. The force 28 applied between the ground-engaging tool 20 and the soil can be calculated based on the dimensions of the various members of the frame 16 and the ground-engaging tool 20. The load sensor(s) 30, 32 may be arranged in any suitable location such that a force may be measured that is indicative of the force 28 between the ground-engaging tool 20 and the soil.

In some embodiments, the load sensor(s) 30, 32 may be or include load pins (e.g., a single-axis load pin or multiple-axis load pin) or any other suitable type of load sensors. The load sensor(s) 30, 32 may be integrally formed or integrated with the actuators 24. For example, one or more of the actuators 24 may be "smart" actuators. Thus, the load sensor(s) 30, 32 may be configured to sense a load value indicative of a force applied by the ground-engaging tool against the soil during the tillage operation.

In some embodiments, the implement 10 may include one or more pressure sensors coupled with the actuator(s) 24 and configured to detect a pressure of a fluid inside the actuator(s) 24. In some embodiments, the pressure inside the actuator(s) 24 may be a load value indicative of the force applied by the ground-engaging tool against the soil during the tillage operation.

The implement 10 may include one or more position sensors 34 configured to measure a position of the actuator(s) 24. The position sensors 34 may be coupled to the actuator(s) 24 and/or integrated with the actuator(s) 24. The position sensors 34 may be a variety of types of suitable linear sensors. Examples include linear variable differential transformer (LVDT), magnetic, optical, and/or any other suitable type of position sensor.

Figure 3A:
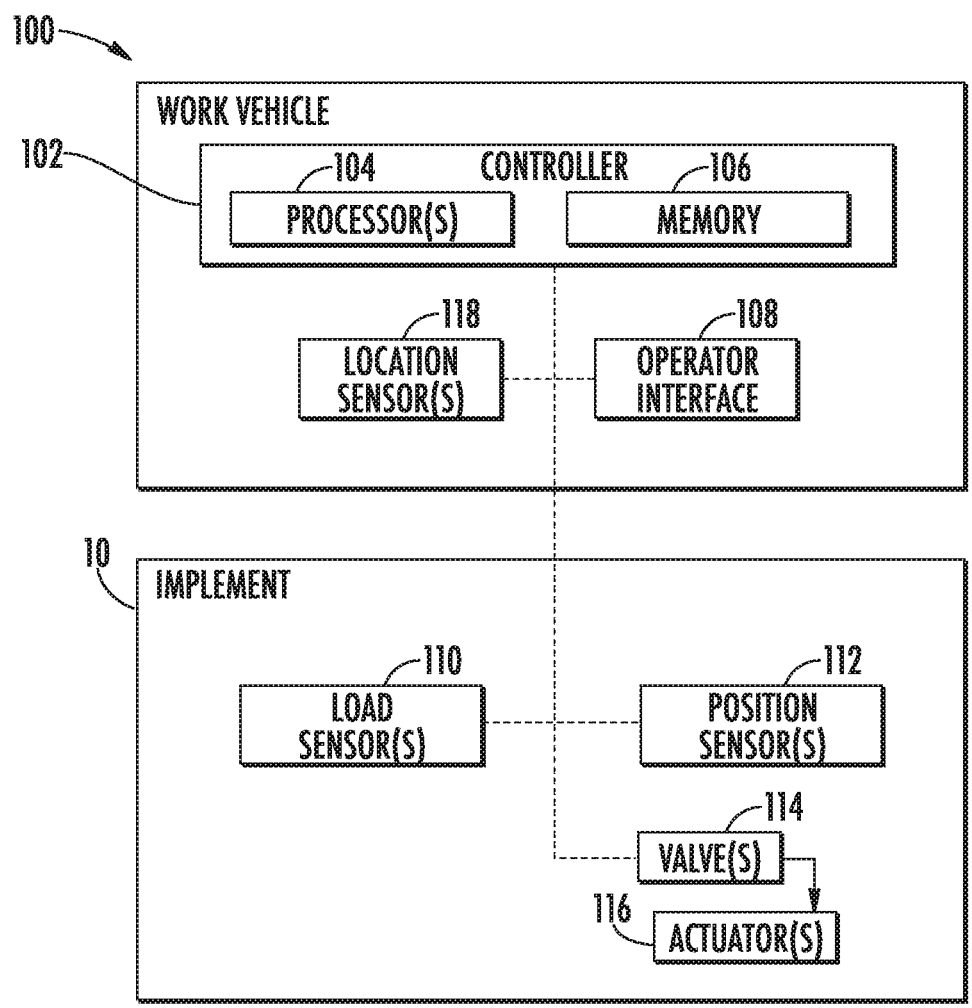
FIG. 3A illustrates a schematic view of one embodiment of a system for automatically controlling an agricultural implement during the performance of a tillage operation in accordance with aspects of the present subject matter.

FIG. 3A is a schematic view of one embodiment of a system 100 for controlling a tillage operation with respect to soil in a field being performed with an implement. The system 100 may be described with reference to the implement 10 and ground-engaging tools 20 described above with reference to FIGS. 1 and 2. However, it should be understood that the system 100 may be used with any suitable implement and ground-engaging tools configured to perform a tillage operation.

The system 100 may include a controller 102. The controller 102 may be installed on and/or otherwise provided in operative association with the work vehicle 10. Alternatively, the controller 102 may be installed on and/or otherwise provided in operative association with the implement 10. In some embodiments, a vehicle controller may be installed on the work vehicle and an implement controller may be installed on the implement 10. The vehicle controller may be communicatively coupled with the implement controller.

In general, the controller 102 may correspond to any suitable processor-based device known in the art, such as a computing device or any suitable combination of computing devices. For example, the controller may generally be configured as electronic control units (ECUs). Thus, in several embodiments, the implement controller 102 may include one or more processor(s) 104 and associated memory device(s) 106 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 106 may generally comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 106 may generally be configured to store suitable computer-readable instructions that, when implemented by the processor(s), configure the vehicle controller 104 and/or controller 102 to perform various computer-implemented functions, such as one or more aspects of the method 200 described below with reference to FIG. 5. In addition, the controller 102 may also include various other suitable components, such as a communications circuit or module, one or more input/output channels, a data/control bus and/or the like.

The controller 102 may be communicatively coupled to an operator interface 108 of the work vehicle. In general, the operator interface 108 may correspond to any suitable input device(s) configured to allow the operator to provide operator inputs to the controller 102, such as a touch screen display, a keyboard, joystick, buttons, knobs, switches, and/or combinations thereof located within a cab of the work vehicle. The operator may provide various inputs into the system 100 via the operator interface 102. For example, the operator may input a desired reset pressure for the adjustable valve(s) via the operator interface 212.

The system 100 may include one or more load sensors 110, which may correspond with one or more of the load sensors 30, 32 described above with reference to FIGS. 1 and 2. In some embodiments, the load sensors 110 may include one or more pressure sensors configured to detect a pressure of fluid inside the actuator(s) 24. The controller 102 may be communicatively coupled with the load sensor(s) 110 and configured to determine a load value indicative of the force applied by the ground-engaging tool against the soil based on signals received from the load sensor(s) 110.

The system 100 may include one or more position sensors 112, which may correspond with the position sensor(s) 34 described above with reference to FIGS. 1 and 2. The controller 102 may be communicatively coupled with the position sensors 112.

The system 100 may include one or more adjustable valve(s) 114 configured to regulate respective fluid pressures associated with one or more of actuator(s) 118. The adjustable valve(s) may be configured as adjustable pressure reducing/relief valve(s). The actuators 118 may correspond with the actuators 24 described above with reference to FIGS. 1 and 2. As described above, a hydraulic source, such as a pump, may provide a flow of hydraulic fluid through the adjustable valve(s) 114 to the actuators 116. The adjustable valve(s) 114 may have associated reset pressures. When a fluid pressure within one of the actuators 116 exceeds the reset pressure of the associated adjustable valve 116, the adjustable valve 116 may permit a flow of hydraulic fluid (e.g., hydraulic fluid or gas) out of the respective actuator 116 such that the actuator 116 may be compressed to allow the ground-engaging tool 20 to pivot towards the retracted position.

The controller 102 may be configured to adjust the reset pressure(s) of the respective adjustable valve(s) 114. As such, the controller 102 can adjust the bias force applied by the actuator(s) 116 with respect to the ground-engaging tools 20. Thus, the controller 102 may be configured to adjust a force required to compress the actuators from a fully extended position and pivot each ground-engaging tool 20 from the fully extended position.

In some embodiments, the system 100 may include one or more location sensor(s) 118 configured to determine a location of the implement 10 within the field. Example location sensor(s) 118 include global positioning system (GPS) receivers or other suitable location sensor.

Figure 3B:
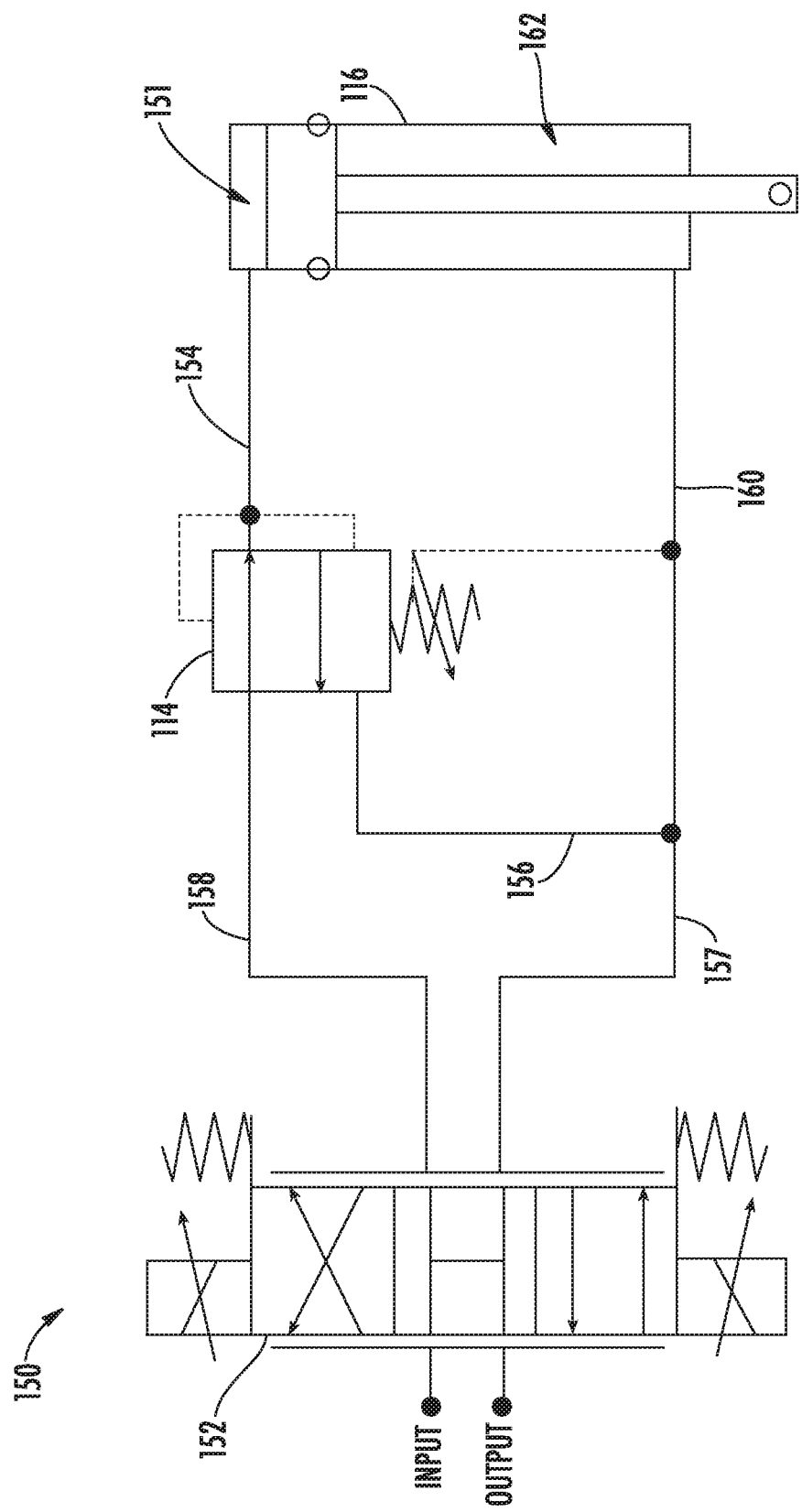
FIG. 3B is a schematic view of one embodiment of a valve assembly, which may include an adjustable valve, in accordance with aspects of the present subject matter.

FIG. 3B is a schematic view of one embodiment of a valve assembly 150, which may include an adjustable valve, for example as describe above with reference to FIGS. 1 through 3A. The valve assembly 150 may include the adjustable valve 114 of FIG. 3A, which may be configured as an adjustable pressure reducing/relief valve. The adjustable valve 114 may be configured to permit flow out of the actuator 116 when a fluid pressure of the actuator 116 (e.g., in an extension chamber 151 of the actuator 116) exceeds a reset pressure such that the actuator 116 can be compressed to allow the associated ground-engaging tool(s) to pivot towards the retracted position. The adjustable valve 114 can be configured to provide the reset pressure or another predetermined pressure to the actuator 116 (e.g., the extension chamber 151 of the actuator 116) to extend the actuator 116 after the actuator 116 has been compressed (e.g., by a collision with the associated ground engaging tool(s)). For example, the adjustable valve 114 may provide a predetermined return pressure that is greater than the reset pressure.

The valve assembly 150 may also include a directional control valve 152. The directional control valve 152 may be fluidly coupled with the adjustable valve 114 and configured to control or route flow in different ways in different circumstances.

For example, the directional control valve 152 may be configured to control or direct flow from the actuator 116 when flow to the actuator 116 is not needed. When the actuator 116 is fully extended and no flow to the actuator 116 is required to maintain the extended position of the actuator 116, the directional control valve 152 can divert flow from the adjustable valve 114 (e.g., from an input to an output of the valve assembly 150).

When the pressure in the actuator 116 (e.g., the extension chamber 151) exceeds the reset pressure of the adjustable valve 114, the adjustable valve 114 can permit flow out of the actuator 116 to allow the actuator 116 to be compressed such that the associated around-engaging tool(s) can pivot away from the fully extended position. During such compression of the actuator 116, the directional control valve 152 can permit flow from the adjustable valve 114 to the output of the of the valve assembly 150. More specifically, fluid can flow from the actuator 116 through a first line 154 to the adjustable valve 114. The first line 154 can be connected between the actuator 116 and the adjustable valve 114. The fluid can flow from the adjustable valve 114 through a second line 156 and a third line 157 to the directional control valve 152. The directional control valve 152 can permit flow from the third line 157 to the output.

Once the load on the actuator 116 has been reduced (e.g., after a collision is complete), the directional control valve 152 can provide flow to the actuator 116 to facilitate extension of the actuator 116. For example, the directional control valve 152 can provide flow from the input to the adjustable valve 114 through a fourth line 158 that can be connected between the directional control valve 152 and the adjustable valve 114. The fluid can flow through the adjustable valve 114 and the first line 154 to the actuator 116 to facilitate extension of the actuator 116. The adjustable valve 114 may provide the reset pressure or another predetermined pressure to the actuator 116 to extend the actuator 116. For example, the adjustable valve 114 may provide a predetermined return pressure that is greater than the reset pressure.

In some embodiments, the actuator 116 may be a double-acting actuator. In such embodiments, the actuator 116 may be fluidly connected with the directional control valve 152 through a fifth line 160 and the third line 157. The directional control valve 152 may permit flow from a retraction chamber 162 of the actuator 116 to the output during extension of the actuator 116. However, in other embodiments, the actuator 116 may be a single-acting actuator and may be free of a retraction chamber 162. In such other embodiments, the valve assembly may be configured to only extend the actuator 116 without retracting the actuator 116.

Figure 4:
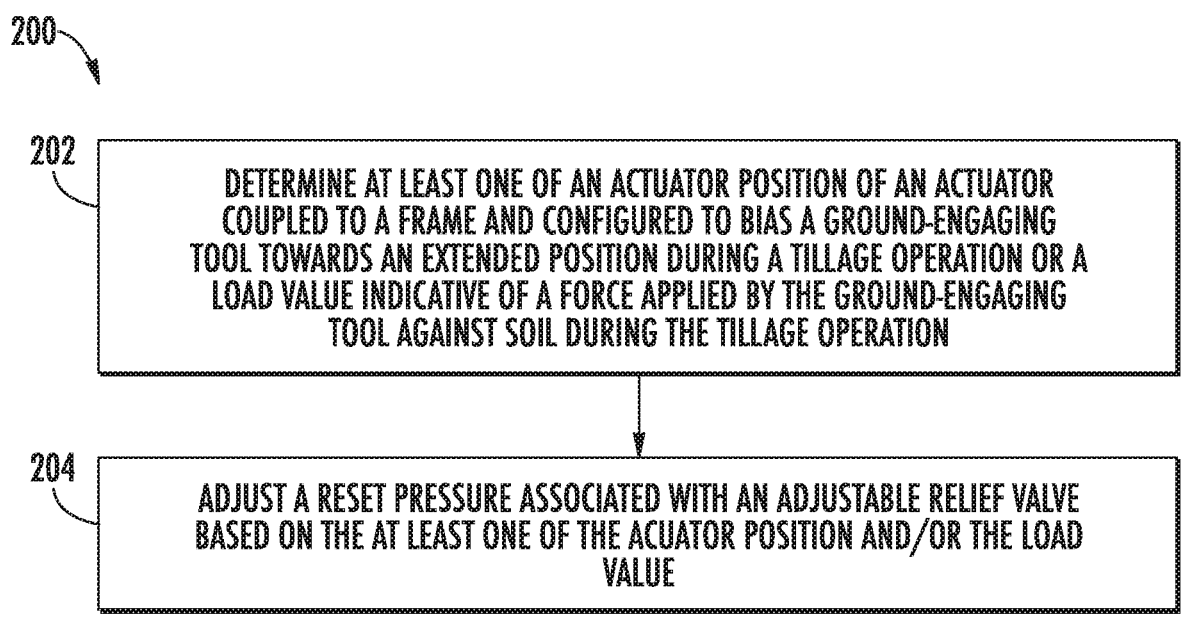
FIG. 4 is a flow diagram of a method for automatically controlling an agricultural implement during the performance of a tillage operation in accordance with aspects of the present subject matter.

FIG. 4 illustrates a flow diagram of one embodiment of a method 200 for controlling a tillage operation with respect to soil in a field being performed with an implement according to aspects of the present subject matter. In general, the method 200 will be described herein with reference to the implement 10 and system 100 described above with reference to FIGS. 1 through 3. However, it should be appreciated by those of ordinary skill in the art that the disclosed method 200 may generally be utilized to control the position of any suitable ground-engaging tools relative to an implement. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

The method 200 may include, at (202), determining at least one of an actuator position of an actuator coupled to the frame and configured to bias a ground-engaging tool towards an extended position during a tillage operation or a load value indicative of a force applied by the ground-engaging tool against soil during the tillage operation. For example, the controller 102 may determine the position of the actuator(s) 116 based on signals received from the position sensor(s) 112. Additionally or alternatively, the controller 102 may be configured to determine a load value that is indicative of the force 28 applied by the ground-engaging tool 20 against soil during the tillage operation based on signals received from the load sensor(s) 110.

In some alternative embodiments, the method 200 may include determining a position of the ground-engaging tool 20 or arm 26. For example, the position of the ground-engaging tool 20 or arm 26 may be detected using an accelerometer coupled to the ground-engaging tool 20, using a visual sensor (e.g., a camera), using a rotary position sensor at one or more pins or joints (e.g., between the actuator 24 and frame 16, between the arm 26 and the frame 16, and/or between the actuator 24 and arm 26), and/or any other suitable means. The position of the actuator may then be determined based on the position of the ground-engaging tool 20

The method 200 may include, at (204), adjusting a reset pressure associated with the adjustable valve 114 based on the actuator position and/or the load value. The controller 102 may generally be configured to adjust the reset pressure such that the actuator stays fully extended unless impacted by an underground object. In other words, the controller 102 may adjust the reset pressure such that the force 28 applied by soil against the ground-engaging tool 20 does not frequently pivot the ground-engaging tool 20 from the fully extended position during normal operation. Instead, the hydraulic pressure inside the actuator 116 may generally maintain the actuator 116 in the fully extended position.

Figure 5:
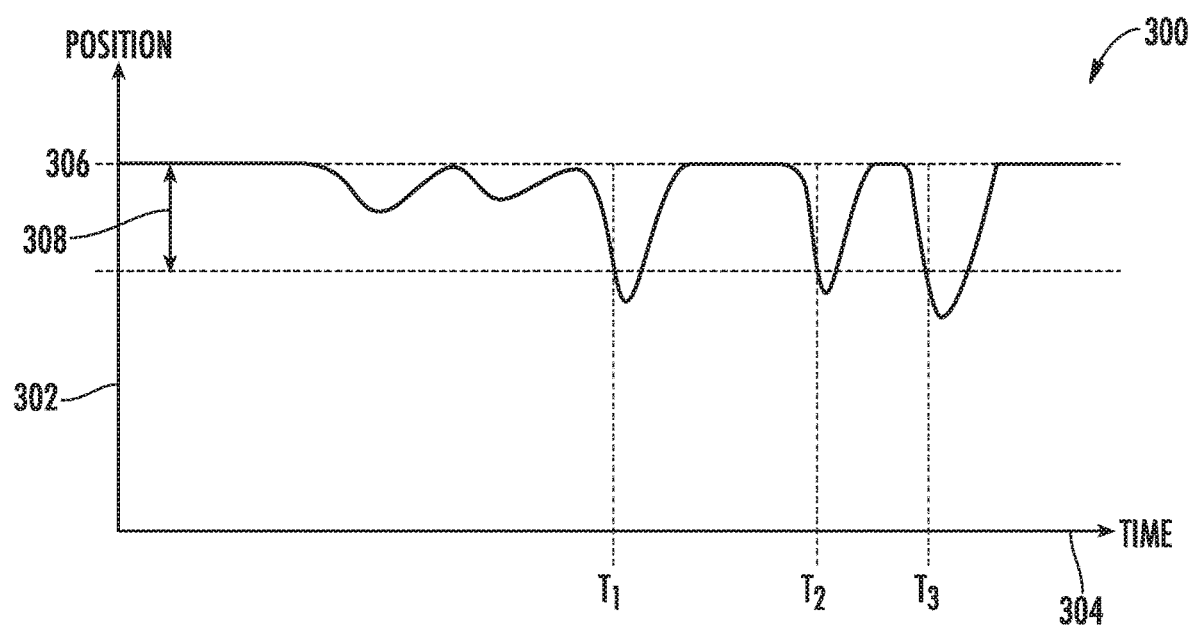
FIG. 5 illustrates a simplified example of a low pressure pattern according to aspects of the present subject matter.

Referring to FIG. 5, in some embodiments, the method 200 may include detecting a low pressure pattern associated with the sensed actuator position and increasing the reset pressure when the low pressure pattern is detected. FIG. 5 illustrates a simplified example of a low pressure pattern 300 with the sensed actuator position 302 on the vertical axis and time 304 on the horizontal axis. The low pressure pattern 300 may include the sensed actuator position 302 varying from a fully extended position 306 by more than a predetermined threshold 308, for example at $T_1$. Such a pattern 300 indicates that the force 28 applied by the soil against the ground-engaging tool 20 is compressing the actuator 24.

In some embodiments, the low pressure pattern 300 may include the sensed actuator position 302 varying from the fully extended position 306 by more than the predetermined threshold 308 at a frequency that is greater than a predetermined frequency. For example, in the example low pressure pattern 300, the sensed actuator position 302 varies from the fully extended position 306 by more than the predetermined threshold 308 at $T_2$, and $T_3$. When the reset pressure is too low for the soil conditions and/or tillage speed, the actuator 116 may alternate between fully extended and slightly compressed. The controller 102 may be configured to detect the frequency of such occurrences (e. $T_1$, $T_2$, and $T_3$) based on the number of times the sensed actuator position 302 exceeds the predetermined threshold 308 within a set unit of time (e.g., one second, ten seconds, one minute, etc.). The controller 102 may compare the frequency of such occurrences with a predetermined frequency threshold to determine if a low pressure pattern is occurring.

Such a procedure may be useful in differentiating between an impact with an underground object, in which the sensed actuator position 302 may vary from the fully extended position 306 by more than the predetermined threshold 308. However, impact events are generally likely to occur at a very low frequency, such that impacts will not be confused with the low pressure pattern 300.

In some embodiments, the controller 102 may be further configured to detect an object collision pattern associated with the load value. The controller 102 may be configured to decrease the reset pressure when the object collision pattern is detected. For example, the object collision pattern may include a large and sudden increase in the force 28 applied to the ground-engaging tool 20. Such a large and sudden increase may be detected before the actuator 116 can be significantly compressed. The controller 102 may be configured to quickly decrease the reset pressure such that the actuator 116 can be more easily compressed. Thus, the controller 102 may adjust the reset pressure such that the ground-engaging tool 20 can more easily pivot towards the retracted position when impacted than otherwise possible without adjustment of the reset pressure.

In some embodiments, the controller 102 may be configured to decrease respective reset pressures associated with a ground-engaging tool 20 other than the ground-engaging tool 20 for which the object collision pattern was detected. The ground-engaging tool 20 for which the object collision pattern was detected may be located in "front" of the ground-engaging tool 20 for which the reset pressure is decreased. For example, referring again to FIG. 2, when the object collision pattern is detected for an actuator 24 in the front row 25 of actuators 24, the controller 102 may decrease the reset pressures associated with some or all of the ground-engaging tools 20 of the rear row 27. This may facilitate pivoting of the some or all of the ground-engaging tools 20 towards the retracted position when impacted by the underground object that impacted the ground-engaging tool 20 of the front row 25 for which the object collision pattern was detected. In some embodiments, the controller 102 may be configured to decrease the reset pressures of only the ground-engaging tools 20 that are proximate the ground-engaging tool 20 for which the object collision pattern was detected (e.g., in the lateral direction 29). In other words, the controller 102 may decrease the reset pressures of ground-engaging tools 20 that are likely to impact the underground object soon (e.g., those "behind" the ground-engaging tool 20 that has impacted the underground object). In some embodiments, the controller 102 may be configured to detect an underground object based on the at least one of the actuator position of the actuator or the load value. For example, the controller 102 may be configured to detect the underground object when a large increase in the force 28 applied to the ground-engaging tools 20 is detected (e.g., the object collision pattern described above). Similarly, the controller 102 may be configured to detect the underground object when the sensed position of one or more actuators 24 varies rapidly from the fully extended position. For example, the controller 102 may be configured to detect the underground object when the sensed position varies from the fully extended position to a predetermined threshold that is associated with an object impact.

In some embodiments, the controller 102 may be further configured to record the location of the underground object within the field. The controller 102 may receive signals from the location sensor(s) 118 and determine the location of the implement 10 within the field. When an underground object is detected, the controller 102 may record the location of the implement. The controller 102 may generate a map showing the locations of detected objects within the field.

In some embodiments, the controller 102 may be configured to generate a tilling operation map that correlates the location of the implement within the field with sensed actuator position data and/or load values data associated with one or more actuators 24. For example, the controller 102 may receive signals from the location sensor(s) 118 and determine the location of the implement 10 within the field. The controller 102 may determine the positions of one or more actuator(s) 24 based on signals received from the position sensor(s) 112. The controller 102 may record the actuator position data with correlated location data such that a map of the actuator position data is generated. In addition or alternative, the controller 102 may receive signals from the load sensors 110 and record the sensed load values with correlated location data of the implement 10 such that a map of the sensed load values is generated.

In some embodiments, the controller 102 may be configured to determine a total draft load associated with the implement 10 based on the load values of one or more of the actuators 24. For example, the controller 102 may be configured to determine the force 28 associated with each ground-engaging tool 20 and sum the forces 28 to determine the total draft load associated with the implement 10. Alternatively, the controller 102 may be configured to estimate the total draft load by determining the force 28 associated with one actuator 24 and then multiplying the force 28 by the number of actuators 24.

It is to be understood that the steps of the method 200 may be performed by the controller 102 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 102 described herein, such as the method 200, is implemented in software code or instructions which are tangibly stored on a tangible computer readable medium. The controller 102 loads the software code or instructions via a direct interface with the computer readable medium or via a wired and/or wireless network. Upon loading and executing such software code or instructions by the controller 102, the controller 102 may perform any of the functionality of the controller 102 described herein, including any steps of the method 500 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for controlling an implement during the performance of a tillage operation with respect to soil in a field, the system comprising:
    a frame;
    a ground-engaging tool pivotally coupled to the frame such that the ground-engaging tool is movable relative to the frame between a retracted position and an extended position;
    an actuator coupled to the frame and configured to bias the ground-engaging tool towards the extended position during the tillage operation;
    a control valve configured to provide flow to the actuator such that the actuator biases the ground-engaging tool towards the extended position;
    an adjustable relief valve configured to permit flow out of the actuator when a fluid pressure of the actuator exceeds a reset pressure such that the actuator allows the ground-engaging tool to pivot towards the retracted position;
    a controller communicatively coupled with the adjustable relief valve, the controller configured to:
        determine at least one of an actuator position of the actuator or a load value indicative of a force applied by the ground-engaging tool against the soil during the tillage operation; and
        adjust the reset pressure based on the at least one of the actuator position or the load value.

2. The system of claim 1, further comprising a load sensor coupled to the actuator and configured to measure an actuator force associated with the actuator, and wherein the controller is configured to determine the load value by receiving signals from the load sensor.

3. The system of claim 1, further comprising:
    an arm pivotally coupled with the frame, the ground-engaging tool coupled to the arm; and
    a load sensor coupled between the arm and the frame, the load sensor configured to measure an arm force between the frame and the arm;
    wherein the controller is configured to determine the load value by receiving signals from the load sensor.

4. The system of claim 1, further comprising a single axis load pin coupled with the at least one of the actuator or the frame, and wherein the controller is further configured to receive signals from the single axis load pin to determine the load value indicative of the force applied by the ground-engaging tool against the soil during the tillage operation.

5. The system of claim 1, wherein the controller is further configured to:
    detect a low pressure pattern associated with the sensed actuator position; and
    when the low pressure pattern is detected, increase the reset pressure to adjust the reset pressure.

6. The system of claim 5, wherein the low pressure pattern comprises the sensed actuator position varying from a fully extended position of the actuator by more than a predetermined threshold.

7. The system of claim 5, wherein the low pressure pattern comprises the sensed actuator position varying from a fully extended position of the actuator by more than a predetermined threshold at a frequency that is greater than a predetermined frequency.

8. The system of claim 1, wherein the controller is further configured to:
    detect an object collision pattern associated with the load value; and
    when the object collision pattern is detected, decrease the reset pressure to adjust the reset pressure.

9. The system of claim 8, further comprising an additional ground-engaging tool pivotally coupled to the frame of the implement, and wherein the controller is further configured to decrease a reset pressure associated with the additional ground-engaging tool when the object collision pattern is detected for the ground-engaging tool.

10. The system of claim 9, wherein the implement is moved in a forward direction during the tillage operation, and wherein the ground-engaging tool is located in front of the additional ground-engaging tool with respect to the forward direction.

11. The system of claim 1, wherein the controller is further configured to detect an underground object based on the at least one of the actuator position of the actuator or the load value.

12. The system of claim 11, wherein the controller is further configured to record a location of the underground object within the field.

13. The system of claim 1, wherein the controller is further configured to generate a tilling operation map that correlates a location of the implement within the field with the at least one of the actuator position of the actuator or the load value.

14. The system of claim 1, further comprising an additional ground-engaging tool pivotally coupled to the frame of the implement, and wherein the controller is further configured to:
    determine an additional load value indicative of an additional force applied by the additional ground-engaging tool against the soil during the tillage operation; and
    determine a total draft load associated with the implement based on the load value and the additional load value.

15. The system of claim 1, wherein the ground-engaging tool comprises a ripper shank, and wherein the tillage operation comprises a ripper operation.

16. The system of claim 1, wherein the controller is further configured to control an operation of the control valve to provide flow to the actuator to bias the ground-engaging tool back towards the extended position following pivoting of the ground-engaging tool towards the retracted position.

17. A method for controlling a tillage operation with respect to soil in a field being performed with an implement comprising a frame and a ground-engaging tool pivotally coupled to the frame such that the ground-engaging tool is movable between a retracted position and an extended position relative to the frame, the method comprising:
    controlling, by one or more computing devices, an operation of a control valve such that the control valve provides flow to an actuator coupled to the frame of the implement such that the actuator biases the ground-engaging tool towards the extended position;
    determining, by the one or more computing devices, at least one of an actuator position of the actuator or a load value indicative of a force applied by the ground-engaging tool against the soil during the tillage operation; and
    adjusting, by the one or more computing devices, a reset pressure associated with an adjustable relief valve based on the at least one of the actuator position or the load value, the adjustable relief valve being configured to permit flow out of the actuator when a fluid pressure of the actuator exceeds the reset pressure such that the actuator permits the ground-engaging tool to pivot towards the retracted position.

18. The method of claim 17, wherein determining the at least one of the actuator position or the load value comprises determining the load value by receiving signals from a load sensor coupled to the actuator and configured to measure an actuator force associated with the actuator.

19. The method of claim 17, wherein determining the at least one of the actuator position or the load value comprises determining the actuator position, and wherein the method further comprises:
    detecting a low pressure pattern associated with the sensed actuator position; and
    when the low pressure pattern is detected, increasing the reset pressure to adjust the reset pressure.

20. The method of claim 17, further comprising detecting an underground object based on the at least one of the actuator position of the actuator or the load value.

21. The method of claim 17, further comprising controlling the operation of the control valve to provide flow to the actuator to bias the ground-engaging tool back towards the extended position following pivoting of the ground-engaging tool towards the retracted position.

* * * * *